(12) United States Patent
Dobrusskin et al.

(10) Patent No.: US 6,354,947 B1
(45) Date of Patent: Mar. 12, 2002

(54) MULTIMEDIA METHOD AND SYSTEM FOR INTERACTION BETWEEN A SCREEN-BASED HOST AND VARIOUS DISTRIBUTED AND FREE-STYLED INFORMATION CONTAINING ITEMS, AND AN INFORMATION CONTAINING ITEM FOR USE WITH SUCH SYSTEM

(75) Inventors: Christoph Dobrusskin; Jacoba J. Van Dorssen; Paul D. McGroary; Roger P. Swales, all of Eindhoven; Jan P. C. Van Der Voet, Haren, all of (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/031,695

(22) Filed: Feb. 27, 1998

(30) Foreign Application Priority Data

Mar. 12, 1997 (EP) .............................. 97200738

(51) Int. Cl.[7] .............................. A63F 9/24; G06F 12/00
(52) U.S. Cl. .............................. 463/43; 463/1; 463/30; 463/40
(58) Field of Search .............................. 463/43, 42, 41, 463/40, 39, 35, 36, 1

(56) References Cited

U.S. PATENT DOCUMENTS

| | | | | |
|---|---|---|---|---|
| 4,467,424 A | * | 8/1984 | Hedges et al. | 364/412 |
| 5,377,997 A | * | 1/1995 | Wilden et al. | 273/434 |
| 5,636,920 A | * | 6/1997 | Shur et al. | 364/410 |
| 5,707,289 A | * | 1/1998 | Watanable et al. | 463/40 |
| 5,735,744 A | * | 4/1998 | Okamoto | 463/40 |
| 5,782,692 A | * | 7/1998 | Stelovsky | 463/1 |
| 5,788,507 A | * | 8/1998 | Redford et al. | 434/307 R |
| 5,818,441 A | | 10/1998 | Throckmorton et al. | 345/328 |
| 5,830,065 A | * | 11/1998 | Sitrick | 463/31 |
| 5,851,149 A | * | 12/1998 | Xidos et al. | 463/43 |
| 6,052,120 A | * | 12/1998 | Nahi et al. | 345/326 |
| 5,903,647 A | * | 5/1999 | Ronning | 380/4 |
| 5,911,582 A | * | 6/1999 | Redford et al. | 434/307 R |
| 6,064,420 A | * | 5/2000 | Harrison et al. | 348/12 |

FOREIGN PATENT DOCUMENTS

| | | | | |
|---|---|---|---|---|
| WO | 9603188 A1 | 2/1996 | | A63F/3/00 |

* cited by examiner

Primary Examiner—Lee Young
Assistant Examiner—Minh Trinh
(74) Attorney, Agent, or Firm—Gregory L. Thorne

(57) ABSTRACT

A screen-based host with processing and I/O facilities interacts with distributed items that are arranged for storing and exchanging digital information with the host. In particular, under proximity conditions and initially without user interaction, the items exchange accordingly with the host without requiring formatted berth facilities of the host. The various items through associated self-identifying evoke specific iconizing by the host for signaling to the user an associated service field. The host allows a user person to activate data processing operations with respect to the service field. During proximity conditions, the items keep abreast of host-generated results relevant to a corresponding service field. The host allows free styling of the items with respect to the item's physical shape.

5 Claims, 2 Drawing Sheets

MULTIMEDIA METHOD AND SYSTEM FOR INTERACTION BETWEEN A SCREEN-BASED HOST AND VARIOUS DISTRIBUTED AND FREE-STYLED INFORMATION CONTAINING ITEMS, AND AN INFORMATION CONTAINING ITEM FOR USE WITH SUCH SYSTEM

BACKGROUND OF THE INVENTION

The invention relates to a multimedia method for use with a screen-based host system provided with information processing and I/O facilities, and interacting with one or more distributed items that are arranged for storing information and exchanging information with the host system. Various computer systems have been proposed to interact with external memory carriers for exchanging data therewith, such as programs. On the other hand, multimedia systems that to a certain extent are designed to operate under non-data-processing conditions and with various different types of operator persons, that in particular may not be computer literate, should have a user interface that is very different in style and functionality. The inventors have recognized that functionality and styling of such data carriers should attract such other social environment.

SUMMARY TO THE INVENTION

In consequence, amongst other things, it is an object of the present invention to provide the system versus such data items with an immediate reactivity and physical recognizability as to their content. Now therefore, according to one of its aspects, the invention is characterized in that said multimedia method comprises the steps of allowing the distributed items to exchange analog or digital information under proximity conditions with respect to the host, but without requiring formatted berth facilities of the host, with respect to various such items evoking through self-identifying thereof associated specific iconizing by the host for signaling to a user an associated and selective information processing and/or entertainment oriented service field, furthermore so allowing by the host a user person to activate information processing operations with respect to the selective service field, having each item so keeping abreast of host-generated results during such proximity conditions as being relevant to its associated field, whilst allowing free styling of such item with respect to physical shape requirements thereto.

The evoking of a specific icon on the host screen is token for an allowable interactivity, and the storing of appropriate processing results in the item allows a user to discontinue a session, whilst still being able to later resume at an interaction point that is deemed relevant. The free-styling of the items makes recognizing easier for little children and other categories of people.

By itself, PCT published Patent application WO 96 03188 A1 discloses a system wherein particular toy figures in proximity conditions with the system may identify themselves versus the system for so activating an associated audio visual display sequence on the system display. However, the toys will only identify themselves towards the system, whereas the present invention additionally allows to store various data processing quantities in the information item, as well as to lend to the items a characteristic shape.

The invention also relates to a system arranged for implementing the method, and to an item for use with the method. Further advantageous aspects of the invention are recited in dependent claims.

BRIEF DESCRIPTION OF THE DRAWING

These and further aspects and advantages of the invention will be discussed more in detail with reference to the disclosure of preferred embodiments hereinafter, and in particular with reference to the appended Figures that show.

DETAILED DESCRIPTION OF PREFERRED EMBODIMENTS

Figure 1:
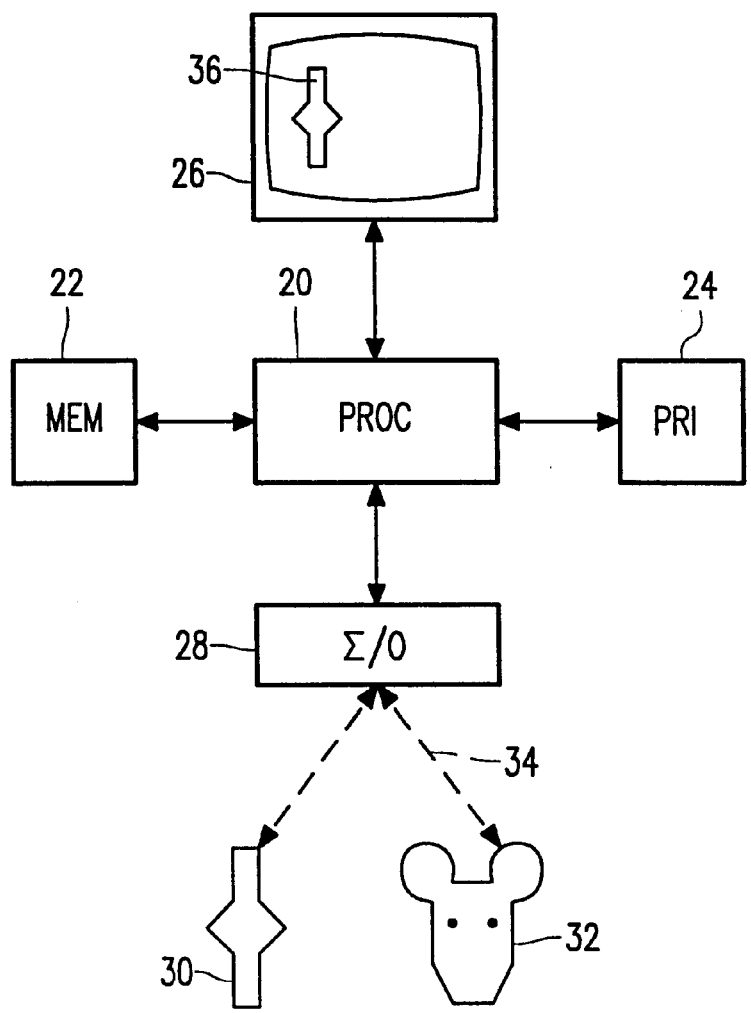
FIG. 1, a block diagram of a system of the invention.

FIG. 1 is a block diagram of an exemplary system according to the invention. The screen-based host has central processing facility 20, memory facility 22, printer facility 24, display screen facility 26, and I/O facility 28. A system with fewer than all of the above facilities could be feasible as well. All of these facilities are interconnected as shown by arrows. Two of the distributed and free-styled information items 30, 32 have been shown, one of them having a geometrical shape, and the other being shaped as a recognizable toy figurine. The screen is preferably a touch or stylus actuated screen. The I/O facilities may comprise keyboard, joystick, mouse, speech-based interaction and further facilities which have not been shown specifically; none of these are really indispensable, provided that at least one mechanism for receiving user interaction is available. In particular however, arrows 34 symbolize wireless intercommunication between I/O subsystem 28 and the distributed items 30, 32. As shown on the display screen 26, interaction between item 30 and I/O makes an icon 36 appear that may correspond to the physical shape of the item in question, or otherwise symbolize the associated service field.

Figure 2:
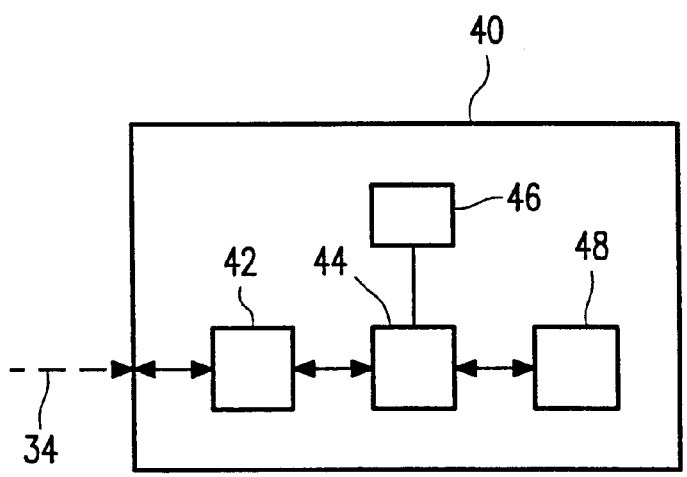
FIG. 2, a block diagram of an item of the invention.

FIG. 2 is a block diagram of an information item 40 according to the invention. As shown, the item itself has not been detailed as to the styling thereof. Various parts of the item are communication part 40 for interfacing to wireless connection 34, processing part 44, permanent memory part 48 and variable memory part 46. All of these facilities are internally interconnected as shown by arrows. Furthermore, battery powering is on board but has not been shown for brevity; solar cell powering is feasible as well. Useable examples for the styling are: semi-personal toy figures like Barbie-dolls or (semi)-animals, geometrical shapes like diabolo's or toroids, fantasy shapes or minimal art with contorted or abstracted forms, or rather common household articles such as a decorative vase, a presse-papier, or other. The electronic part thereof would be barely more than a single solid state chip with a few elements for the communication, such as a loop antenna or the like. The two-dimensional icon representation on the screen of the generally three-dimensional item may symbolize the shape of the item. Alternatively, the icon may represent the associated service field. Further, after entering the screen, the icon may be a scalled dynamic icon that suggests some level of life or action therein. Such dynamism may include geometrical transform in 2-D or 3-D, animation, colour change, and others. Also, the entire screen may be filled with graphics that represent the item and/or the service filed, such as used in screen savers.

Figure 3:
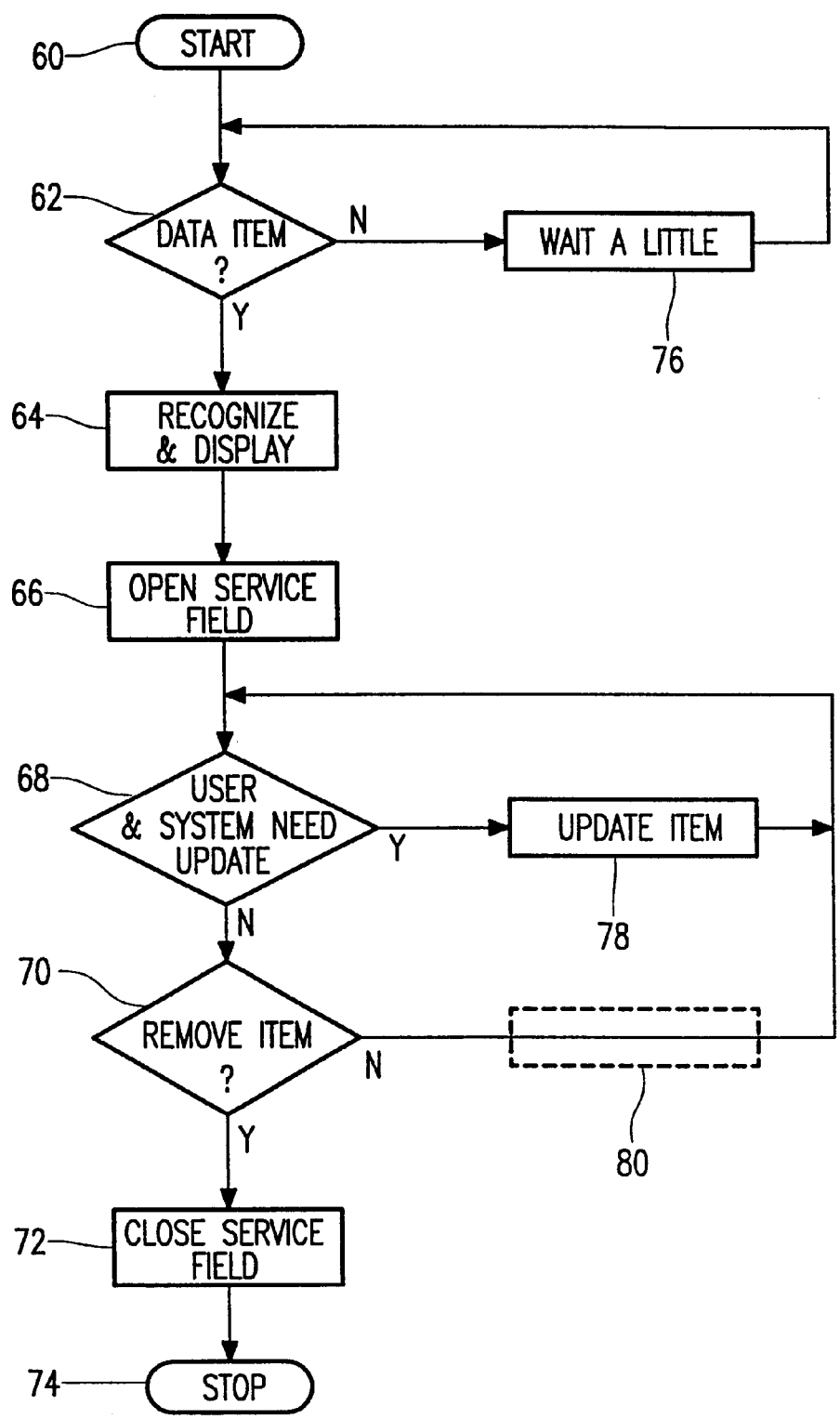
FIG. 3, a flow chart of the interaction.

FIG. 3 is an exemplary flow chart of the interaction between the host system and a single distributed item. In block 60, the host system is activated, such as by a power switch. In block 62, the host detects whether a distributed item is within an appropriate proximity; this may be a distance of about one meter, or a presence in the same room.

If no, block 76 implements a waiting loop. If yes, in block 64, the identity of the item is recognized. This may be effected through an elementary dialogue between host and item, or even with the item as an object that is electronically passive, e.g. in that it may detune an RF field or through other means. The identity may be a discrete quantity, such as a frequency value in a particular range, or a full digital information, such as an eight-bit code stored in a permanent memory part of the item. Upon recognition, the associated icon is displayed, either in a standard manner, or updated from some information retrieved from the variable memory part of the item. There may be feedback on the item, such as in the form of a LED or beep, even if the proximity condition is not fulfilled.

Next, the service field is opened. This field may pertain to a particular information-related area pertaining to the item, such as a video game in which the item figures as a character, an audio story that is read from the host memory and may imply choices to be made by a listener, a video diary that may be kept and updated by the user person, and various others. Various different service fields may in alternation be produced by any host. The user may now interact immediately with the host, for changing content and/or visualisation of the service field. In block 68 the system detects whether user item or system would need an update. If yes, in block 78, the content of the variable memory of the item is updated. In block 70, it is detected whether the item is being removed or has been removed from the proximity condition in question. If no, in block 80 a waiting interval may be implemented or not. If the item has been removed, in block 72 the service field is closed, the content of the permanent memory of the item is being frozen for later use, and the iconized display of the actual item is suppressed. In block 74, the system, and in particular the host, is stopped.

The information stored into the item to keep it abreast with the associated service field may be various. In a game of skills, the information may indicate the level of skill actually attained by the user person. In case of a toy, the user may decide to give the item a name, and the name is stored, so that the host may call by voice the item upon its presentation. This also applies if the service field would also run on another host. The information may be a brief song, so that the host will sing this song when the item is again presented. Various other types of information might be relished by a user person.

What is claimed is:

1. A multimedia system comprising:

a screen-based host, and a distributed item arranged for storing information and exchanging information with the host system, wherein said host comprises recognition means for self-identifying said item in response to proximity conditions between said host and said item and for signaling to a user an associated service field.

2. The system of claim 1, comprising iconizing means responsive to said self-identifying to produce associated specific iconizing for signaling to a user said associated service field.

3. The system of claim 1, comprising an input for a user person to activate information processing operations related to said associated service field.

4. The system of claim 1, comprising transmission means for transmitting to said item host-generated results during such proximity conditions related to said associated service field.

5. An information item arranged for distributed use in a multimedia system comprising a screen-based host, said item comprising:

self-identifying means for enabling the host to recognize said item in response to proximity conditions between the host and said item and for activating a particular information service field, and reception means for enabling said item to keep abreast of host-generated results relevant to said particular information service field during said proximity conditions upon a person activating information processing operations related to said particular information service field.

* * * * *